US008615622B2

(12) United States Patent  
Gregg et al.

(10) Patent No.: US 8,615,622 B2  
(45) Date of Patent: Dec. 24, 2013

(54) NON-STANDARD I/O ADAPTERS IN A STANDARDIZED I/O ARCHITECTURE

(75) Inventors: Thomas A. Gregg, Highland, NY (US); Gerd K. Bayer, Stuttgart (DE); David F. Craddock, New Paltz, NY (US); Michael Jung, Frankfurt am Main (DE); Eric N. Lais, Tillson, NY (US); Elke G. Nass, Ehningen (DE)

(73) Assignee: International Business Machines Corporation, Armonk, NY (US)

( * ) Notice: Subject to any disclaimer, the term of this patent is extended or adjusted under 35 U.S.C. 154(b) by 185 days.

(21) Appl. No.: 12/821,242

(22) Filed: Jun. 23, 2010

(65) Prior Publication Data

US 2011/0320675 A1 Dec. 29, 2011

(51) Int. Cl.  
*G06F 13/36* (2006.01)  
*G06F 13/40* (2006.01)

(52) U.S. Cl.  
CPC .................................. *G06F 13/4027* (2013.01)  
USPC ........................................... 710/315; 710/313

(58) Field of Classification Search  
USPC .................... 710/300–317, 8–19, 1–2, 62–64  
See application file for complete search history.

(56) References Cited

U.S. PATENT DOCUMENTS

| | | |
|---|---|---|
| 4,104,539 A | 8/1978 | Hase |
| 4,611,319 A | 9/1986 | Naito |
| 4,644,443 A | 2/1987 | Swensen et al. |
| 5,027,254 A | 6/1991 | Corfits et al. |
| 5,170,472 A | 12/1992 | Cwiakala et al. |
| 5,282,274 A | 1/1994 | Liu |
| 5,430,856 A | 7/1995 | Kinoshita |
| 5,438,575 A | 8/1995 | Bertrand |
| 5,465,332 A | 11/1995 | Deloye et al. |
| 5,465,355 A | 11/1995 | Cook et al. |
| 5,535,352 A | 7/1996 | Bridges et al. |

(Continued)

FOREIGN PATENT DOCUMENTS

| | | |
|---|---|---|
| CN | 1885096 A | 12/2006 |
| CN | 101196615 A | 6/2008 |

(Continued)

OTHER PUBLICATIONS

PCI Express Base Specification Rev 1.0a, Apr. 15, 2003, pp. 1-2,30-76,101-104.*

(Continued)

*Primary Examiner* — Raymond Phan  
(74) *Attorney, Agent, or Firm* — Cantor Colburn LLP; Steven Chiu

(57) ABSTRACT

A system for implementing non-standard I/O adapters in a standardized I/O architecture, the system comprising an I/O hub communicatively coupled to an I/O bus and at least one I/O adapter, the I/O hub including logic for implementing a method, the method comprising receiving a request to perform an operation on the I/O adapter from a requester at a requester address, the I/O adapter at a destination address, determining that the request is in a format other than a format supported by the I/O bus, the I/O bus expecting a requester identifier at a first location in a header of the request, reformatting the request into the format supported by the I/O bus, the reformatting comprising storing the requester address, the destination address and an operation code at the first location in the header of the reformatted request, and sending the reformatted request to the I/O adapter.

24 Claims, 8 Drawing Sheets

(56) References Cited

U.S. PATENT DOCUMENTS

| | | |
|---|---|---|
| 5,551,013 A | 8/1996 | Beausoleil et al. |
| 5,568,365 A | 10/1996 | Hahn et al. |
| 5,574,873 A | 11/1996 | Davidian |
| 5,600,805 A | 2/1997 | Fredericks et al. |
| 5,617,554 A | 4/1997 | Alpert et al. |
| 5,663,919 A | 9/1997 | Shirley et al. |
| 5,719,647 A | 2/1998 | Fujikawa et al. |
| 5,742,785 A | 4/1998 | Stone et al. |
| 5,761,448 A | 6/1998 | Adamson et al. |
| 5,790,825 A | 8/1998 | Traut |
| 5,815,647 A | 9/1998 | Buckland et al. |
| 5,838,960 A | 11/1998 | Harriman, Jr. |
| 5,870,598 A | 2/1999 | White et al. |
| 5,949,646 A | 9/1999 | Lee et al. |
| 5,960,213 A | 9/1999 | Wilson |
| 5,963,425 A | 10/1999 | Chrysler et al. |
| 6,009,261 A | 12/1999 | Scalzi et al. |
| 6,023,736 A | 2/2000 | Lambeth et al. |
| 6,067,595 A | 5/2000 | Lindenstruth |
| 6,112,311 A | 8/2000 | Beardsley et al. |
| 6,205,530 B1 | 3/2001 | Kang |
| 6,233,693 B1 | 5/2001 | Berglund et al. |
| 6,301,133 B1 | 10/2001 | Cuadra et al. |
| 6,308,255 B1 | 10/2001 | Gorishek, IV et al. |
| 6,330,656 B1 | 12/2001 | Bealkowski et al. |
| 6,341,064 B1 | 1/2002 | Bradley |
| 6,349,380 B1 | 2/2002 | Shahidzadeh et al. |
| 6,362,942 B2 | 3/2002 | Drapkin et al. |
| 6,408,347 B1 | 6/2002 | Smith et al. |
| 6,456,498 B1 | 9/2002 | Larson et al. |
| 6,463,582 B1 | 10/2002 | Lethin et al. |
| 6,519,645 B2 | 2/2003 | Markos et al. |
| 6,523,140 B1 | 2/2003 | Arndt et al. |
| 6,529,978 B1 | 3/2003 | Eide et al. |
| 6,538,881 B1 | 3/2003 | Jeakins et al. |
| 6,544,311 B1 | 4/2003 | Walton et al. |
| 6,578,191 B1 | 6/2003 | Boehme et al. |
| 6,594,148 B1 | 7/2003 | Nguyen et al. |
| 6,595,018 B2 | 7/2003 | Goth et al. |
| 6,615,305 B1 | 9/2003 | Olesen et al. |
| 6,625,169 B1 | 9/2003 | Tofano |
| 6,625,648 B1 | 9/2003 | Schwaller et al. |
| 6,643,727 B1 | 11/2003 | Arndt et al. |
| 6,654,818 B1 | 11/2003 | Thurber |
| 6,658,599 B1 | 12/2003 | Linam et al. |
| 6,704,831 B1 | 3/2004 | Avery |
| 6,721,813 B2 | 4/2004 | Owen et al. |
| 6,721,839 B1 | 4/2004 | Bauman et al. |
| 6,772,264 B1 | 8/2004 | Dayan et al. |
| 6,816,590 B2 | 11/2004 | Pike et al. |
| 6,845,428 B1 | 1/2005 | Kedem |
| 6,845,469 B2 | 1/2005 | Hicks et al. |
| 6,901,537 B2 | 5/2005 | Dawkins et al. |
| 6,907,510 B2 | 6/2005 | Bennett et al. |
| 6,927,975 B2 | 8/2005 | Crippen et al. |
| 6,950,438 B1 | 9/2005 | Owen et al. |
| 6,963,940 B1 | 11/2005 | Glassen et al. |
| 6,970,992 B2 | 11/2005 | Gurumoorthy et al. |
| 6,973,510 B2 | 12/2005 | Arndt et al. |
| 6,978,338 B2 | 12/2005 | Wang et al. |
| 6,996,638 B2 | 2/2006 | Brice, Jr. et al. |
| 7,003,615 B2 | 2/2006 | Chui et al. |
| 7,004,233 B2 | 2/2006 | Hasegawa et al. |
| 7,007,099 B1 * | 2/2006 | Donati et al. ............ 709/237 |
| 7,032,052 B2 | 4/2006 | Sauber et al. |
| 7,042,734 B2 | 5/2006 | Hensley et al. |
| 7,053,502 B2 | 5/2006 | Aihara et al. |
| 7,062,594 B1 | 6/2006 | Sardella et al. |
| 7,065,598 B2 | 6/2006 | Connor et al. |
| 7,075,788 B2 | 7/2006 | Larson et al. |
| 7,093,155 B2 | 8/2006 | Aoki |
| 7,096,308 B2 | 8/2006 | Main et al. |
| 7,103,808 B2 | 9/2006 | Kitamorn et al. |
| 7,107,331 B2 | 9/2006 | Gava et al. |
| 7,107,384 B1 | 9/2006 | Chen et al. |
| 7,107,495 B2 | 9/2006 | Kitamorn et al. |
| 7,127,599 B2 | 10/2006 | Brice, Jr. et al. |
| 7,130,938 B2 | 10/2006 | Brice, Jr. et al. |
| 7,134,040 B2 | 11/2006 | Ayres |
| 7,139,940 B2 | 11/2006 | Arbeitman et al. |
| 7,152,136 B1 | 12/2006 | Charagulla |
| 7,163,546 B2 | 1/2007 | Mirizzi et al. |
| 7,174,550 B2 | 2/2007 | Brice, Jr. et al. |
| 7,177,961 B2 | 2/2007 | Brice, Jr. et al. |
| 7,200,704 B2 | 4/2007 | Njoku et al. |
| 7,206,946 B2 | 4/2007 | Sakakibara et al. |
| 7,209,994 B1 | 4/2007 | Klaiber et al. |
| 7,219,181 B2 | 5/2007 | Carty |
| 7,260,620 B1 | 8/2007 | Halasz |
| 7,260,664 B2 | 8/2007 | Arndt et al. |
| 7,277,968 B2 | 10/2007 | Brice, Jr. et al. |
| 7,293,204 B2 | 11/2007 | Lu et al. |
| 7,296,120 B2 | 11/2007 | Corrigan et al. |
| 7,302,692 B2 | 11/2007 | Bae et al. |
| 7,313,643 B2 | 12/2007 | Sakurai et al. |
| 7,334,107 B2 | 2/2008 | Schoinas et al. |
| 7,340,582 B2 | 3/2008 | Madukkarumukumana et al. |
| 7,370,224 B1 | 5/2008 | Jaswa et al. |
| 7,380,041 B2 | 5/2008 | Belmar et al. |
| 7,398,343 B1 | 7/2008 | Marmash et al. |
| 7,412,488 B2 | 8/2008 | Jha et al. |
| 7,418,572 B2 | 8/2008 | Hepkin |
| 7,420,831 B2 | 9/2008 | Seo et al. |
| 7,444,493 B2 | 10/2008 | Schoinas et al. |
| 7,454,548 B2 | 11/2008 | Belmar et al. |
| 7,457,900 B2 | 11/2008 | Panesar |
| 7,464,174 B1 | 12/2008 | Ngai |
| 7,474,623 B2 | 1/2009 | Boyd et al. |
| 7,475,183 B2 | 1/2009 | Traut et al. |
| 7,478,167 B2 | 1/2009 | Ould-Brahim et al. |
| 7,480,303 B1 | 1/2009 | Ngai |
| 7,493,425 B2 | 2/2009 | Arndt et al. |
| 7,496,045 B2 | 2/2009 | Boyd et al. |
| 7,496,707 B2 | 2/2009 | Freking et al. |
| 7,506,087 B2 | 3/2009 | Ho et al. |
| 7,519,647 B2 | 4/2009 | Carlough et al. |
| 7,525,957 B2 | 4/2009 | Scherer et al. |
| 7,529,860 B2 | 5/2009 | Freimuth et al. |
| 7,530,071 B2 | 5/2009 | Billau et al. |
| 7,535,828 B2 | 5/2009 | Raszuk et al. |
| 7,546,386 B2 | 6/2009 | Arndt et al. |
| 7,546,406 B2 | 6/2009 | Armstrong et al. |
| 7,546,487 B2 | 6/2009 | Marisetty et al. |
| 7,549,090 B2 | 6/2009 | Bailey et al. |
| 7,552,298 B2 | 6/2009 | Bestler |
| 7,558,348 B1 | 7/2009 | Liu et al. |
| 7,562,366 B2 | 7/2009 | Pope et al. |
| 7,565,463 B2 | 7/2009 | Johnsen et al. |
| 7,567,567 B2 | 7/2009 | Muller et al. |
| 7,587,531 B2 | 9/2009 | Brice, Jr. et al. |
| 7,594,144 B2 | 9/2009 | Brandyberry et al. |
| 7,600,053 B2 | 10/2009 | Carlson et al. |
| 7,606,965 B2 | 10/2009 | Njoku et al. |
| 7,613,847 B2 | 11/2009 | Kjos et al. |
| 7,617,340 B2 | 11/2009 | Gregg |
| 7,617,345 B2 | 11/2009 | Clark et al. |
| 7,624,235 B2 | 11/2009 | Wadhawan et al. |
| 7,627,723 B1 | 12/2009 | Buck et al. |
| 7,631,097 B2 | 12/2009 | Moch et al. |
| 7,660,912 B2 | 2/2010 | Gregg |
| 7,676,617 B2 | 3/2010 | Kloeppner |
| 7,729,316 B2 | 6/2010 | Uhlik |
| 7,836,254 B2 | 11/2010 | Gregg et al. |
| 7,873,851 B1 | 1/2011 | Linnell et al. |
| 7,975,076 B2 | 7/2011 | Moriki et al. |
| 8,032,684 B2 | 10/2011 | Pettey et al. |
| 8,041,811 B2 | 10/2011 | Calippe et al. |
| 8,046,627 B2 | 10/2011 | Takubo |
| 8,082,466 B2 | 12/2011 | Tanaka et al. |
| 8,140,917 B2 | 3/2012 | Suetsugu et al. |
| 2002/0112067 A1 | 8/2002 | Chang et al. |
| 2002/0124211 A1 | 9/2002 | Gray et al. |
| 2003/0056155 A1 | 3/2003 | Austen et al. |
| 2003/0058618 A1 | 3/2003 | Soetemans et al. |

(56) References Cited

U.S. PATENT DOCUMENTS

| | | |
|---|---|---|
| 2003/0093604 A1 | 5/2003 | Lee |
| 2003/0097503 A1 | 5/2003 | Huckins |
| 2003/0177221 A1 | 9/2003 | Ould-Brahim et al. |
| 2003/0198180 A1 | 10/2003 | Cambron |
| 2003/0200477 A1 | 10/2003 | Ayres |
| 2004/0024905 A1 | 2/2004 | Liao et al. |
| 2004/0088604 A1 | 5/2004 | Bland et al. |
| 2004/0117534 A1 | 6/2004 | Parry et al. |
| 2004/0130868 A1 | 7/2004 | Schwartz et al. |
| 2004/0133819 A1 | 7/2004 | Krishnamurthy et al. |
| 2004/0136130 A1 | 7/2004 | Wimmer et al. |
| 2004/0199700 A1 | 10/2004 | Clayton |
| 2005/0144533 A1 | 1/2005 | LeVangia et al. |
| 2005/0024187 A1 | 2/2005 | Kranz et al. |
| 2005/0033895 A1 | 2/2005 | Lueck et al. |
| 2005/0071472 A1 | 3/2005 | Arndt et al. |
| 2005/0091438 A1 | 4/2005 | Chatterjee |
| 2005/0116546 A1 | 6/2005 | Zeighami et al. |
| 2005/0146855 A1 | 7/2005 | Brehm et al. |
| 2005/0160214 A1 | 7/2005 | Sauber et al. |
| 2005/0162830 A1 | 7/2005 | Wortman et al. |
| 2005/0182862 A1 | 8/2005 | Ritz et al. |
| 2005/0213513 A1 | 9/2005 | Ngo et al. |
| 2005/0276017 A1 | 12/2005 | Aziz et al. |
| 2005/0286187 A1 | 12/2005 | Liu et al. |
| 2005/0289271 A1 | 12/2005 | Martinez et al. |
| 2005/0289278 A1* | 12/2005 | Tan et al. ................ 710/310 |
| 2006/0053339 A1 | 3/2006 | Miller et al. |
| 2006/0067069 A1 | 3/2006 | Heard et al. |
| 2006/0085150 A1 | 4/2006 | Gorin |
| 2006/0085573 A1 | 4/2006 | Pike et al. |
| 2006/0087813 A1 | 4/2006 | Becker et al. |
| 2006/0087814 A1 | 4/2006 | Brandon et al. |
| 2006/0095607 A1* | 5/2006 | Lim et al. ................... 710/52 |
| 2006/0195644 A1 | 8/2006 | Arndt et al. |
| 2006/0206639 A1 | 9/2006 | Tee et al. |
| 2006/0230208 A1 | 10/2006 | Gregg et al. |
| 2006/0236054 A1 | 10/2006 | Kitamura |
| 2006/0253619 A1 | 11/2006 | Torudbakken et al. |
| 2006/0271718 A1 | 11/2006 | DiPlacido, Jr. et al. |
| 2006/0288130 A1 | 12/2006 | Madukkarumukumana et al. |
| 2006/0291447 A1 | 12/2006 | Siliquini et al. |
| 2007/0008663 A1 | 1/2007 | Nakashima et al. |
| 2007/0069585 A1 | 3/2007 | Bosco et al. |
| 2007/0073955 A1 | 3/2007 | Murray et al. |
| 2007/0078996 A1 | 4/2007 | Chen et al. |
| 2007/0115230 A1 | 5/2007 | Tajiri et al. |
| 2007/0136554 A1 | 6/2007 | Biran et al. |
| 2007/0168636 A1 | 7/2007 | Hummel et al. |
| 2007/0183393 A1 | 8/2007 | Boyd et al. |
| 2007/0186074 A1 | 8/2007 | Bradford et al. |
| 2007/0211430 A1 | 9/2007 | Bechtolsheim |
| 2007/0226386 A1 | 9/2007 | Sharp et al. |
| 2007/0226523 A1 | 9/2007 | Chang |
| 2007/0234018 A1 | 10/2007 | Feiste |
| 2007/0239925 A1 | 10/2007 | Koishi |
| 2007/0245041 A1 | 10/2007 | Hua et al. |
| 2007/0262891 A1 | 11/2007 | Woodral et al. |
| 2007/0271559 A1 | 11/2007 | Easton et al. |
| 2007/0273018 A1 | 11/2007 | Onozuka et al. |
| 2007/0274039 A1 | 11/2007 | Hamlin |
| 2008/0043405 A1 | 2/2008 | Lee et al. |
| 2008/0065796 A1 | 3/2008 | Lee et al. |
| 2008/0069141 A1 | 3/2008 | Bonaguro et al. |
| 2008/0077817 A1 | 3/2008 | Brundridge |
| 2008/0091851 A1 | 4/2008 | Sierra |
| 2008/0091868 A1 | 4/2008 | Mizrachi et al. |
| 2008/0091915 A1 | 4/2008 | Moertl et al. |
| 2008/0114906 A1 | 5/2008 | Hummel et al. |
| 2008/0126648 A1 | 5/2008 | Brownlow et al. |
| 2008/0126652 A1 | 5/2008 | Vembu et al. |
| 2008/0147943 A1 | 6/2008 | Freimuth et al. |
| 2008/0148295 A1 | 6/2008 | Freimuth et al. |
| 2008/0162865 A1 | 7/2008 | Koufaty et al. |
| 2008/0168208 A1 | 7/2008 | Gregg |
| 2008/0189577 A1 | 8/2008 | Arndt et al. |
| 2008/0192431 A1 | 8/2008 | Bechtolsheim |
| 2008/0209114 A1 | 8/2008 | Chow et al. |
| 2008/0222406 A1 | 9/2008 | Tabuchi |
| 2008/0235425 A1 | 9/2008 | Belmar et al. |
| 2008/0239687 A1 | 10/2008 | Leigh et al. |
| 2008/0239945 A1 | 10/2008 | Gregg |
| 2008/0244146 A1 | 10/2008 | Das et al. |
| 2008/0259555 A1 | 10/2008 | Bechtolsheim et al. |
| 2008/0263246 A1 | 10/2008 | Larson et al. |
| 2008/0270853 A1 | 10/2008 | Chagoly et al. |
| 2008/0288661 A1* | 11/2008 | Galles ................................ 710/3 |
| 2006/0237636 A1 | 12/2008 | Gurevich et al. |
| 2009/0037682 A1 | 2/2009 | Armstrong et al. |
| 2009/0070760 A1 | 3/2009 | Khatri et al. |
| 2009/0125666 A1 | 5/2009 | Freking et al. |
| 2009/0144462 A1 | 6/2009 | Arndt et al. |
| 2009/0144731 A1 | 6/2009 | Brown et al. |
| 2009/0182966 A1 | 7/2009 | Greiner et al. |
| 2009/0182969 A1 | 7/2009 | Norgaard et al. |
| 2009/0210527 A1 | 8/2009 | Kawato |
| 2009/0210646 A1 | 8/2009 | BAuman et al. |
| 2009/0222814 A1 | 9/2009 | Astrand |
| 2009/0234987 A1 | 9/2009 | Lee et al. |
| 2009/0240849 A1 | 9/2009 | Corneli et al. |
| 2009/0249039 A1 | 10/2009 | Hook et al. |
| 2009/0254692 A1 | 10/2009 | Feehrer |
| 2009/0276551 A1 | 11/2009 | Brown et al. |
| 2009/0276773 A1 | 11/2009 | Brown et al. |
| 2009/0276774 A1 | 11/2009 | Kinoshita |
| 2009/0328035 A1 | 12/2009 | Ganguly |
| 2010/0005234 A1 | 1/2010 | Ganga et al. |
| 2010/0005531 A1 | 1/2010 | Largman et al. |
| 2010/0027559 A1 | 2/2010 | Lin et al. |
| 2010/0042999 A1 | 2/2010 | Dorai et al. |
| 2010/0077117 A1 | 3/2010 | Asnaashari |
| 2010/0115329 A1 | 5/2010 | Tanaka et al. |
| 2010/0131359 A1 | 5/2010 | Ting et al. |
| 2010/0146089 A1 | 6/2010 | Freimuth et al. |
| 2010/0157463 A1 | 6/2010 | Arizono et al. |
| 2010/0169674 A1 | 7/2010 | Kazama |
| 2010/0205608 A1 | 8/2010 | Nemirovsky et al. |
| 2010/0211714 A1* | 8/2010 | LePage ....................... 710/310 |
| 2010/0287209 A1 | 11/2010 | Hauser |
| 2010/0312894 A1 | 12/2010 | Awad et al. |
| 2011/0029696 A1 | 2/2011 | Uehara |
| 2011/0029734 A1 | 2/2011 | Pope et al. |
| 2011/0131359 A1 | 6/2011 | Pettey et al. |
| 2011/0219161 A1 | 9/2011 | Deshpande et al. |
| 2011/0258352 A1 | 10/2011 | Williams et al. |
| 2011/0265134 A1 | 10/2011 | Jaggi et al. |
| 2011/0317351 A1 | 12/2011 | Pizzolato et al. |
| 2011/0317743 A1 | 12/2011 | DeCusatis et al. |
| 2011/0320602 A1 | 12/2011 | Carlson et al. |
| 2011/0320653 A1 | 12/2011 | Lais et al. |
| 2011/0320666 A1 | 12/2011 | Gregg et al. |
| 2011/0320670 A1 | 12/2011 | Bayer et al. |
| 2011/0320674 A1 | 12/2011 | Gregg et al. |
| 2011/0320675 A1 | 12/2011 | Gregg et al. |
| 2011/0320703 A1 | 12/2011 | Craddock et al. |
| 2011/0320796 A1 | 12/2011 | DeCusatis et al. |
| 2011/0320861 A1 | 12/2011 | Bayer et al. |
| 2011/0320887 A1 | 12/2011 | Craddock et al. |
| 2011/0320892 A1 | 12/2011 | Check et al. |

FOREIGN PATENT DOCUMENTS

| | | |
|---|---|---|
| CN | 101571631 A | 11/2009 |
| CN | 102193239 A | 9/2011 |
| JP | 57191826 | 11/1982 |
| JP | 5981724 | 5/1984 |
| JP | 6279557 | 4/1987 |
| JP | 0553973 | 3/1993 |
| JP | 2007087082 A | 4/2007 |
| JP | 2007241526 A | 9/2007 |
| JP | 2010134627 A | 6/2010 |

(56) References Cited

FOREIGN PATENT DOCUMENTS

| WO | WO9600940 | 11/1996 |
|---|---|---|
| WO | 2009027189 A1 | 3/2008 |

OTHER PUBLICATIONS

Final Office Action mail date Jun. 15, 2011 for U.S. Appl. No. 12/821,221.
U.S. Appl. No. 12/821,221, filed Jun. 23, 2010.
U.S. Appl. No. 12/821,222, filed Jun. 23, 2010.
U.S. Appl. No. 12/821,224, filed Jun. 23, 2010.
U.S. Appl. No. 12/821,226, filed Jun. 23, 2010.
U.S. Appl. No. 12/821,239, filed Jun. 23, 2010.
U.S. Appl. No. 12/821,243, filed Jun. 23, 2010.
U.S. Appl. No. 12,821,245, filed Jun. 23, 2010.
U.S. Appl. No. 12/821,247, filed Jun. 23, 2010.
U.S. Appl. No. 12/821,248, filed Jun. 23, 2010.
U.S. Appl. No. 12/821,250, filed Jun. 23, 2010.
U.S. Appl. No. 12/821,256, filed Jun. 23, 2010.
U.S. Appl. No. 12/821,271, filed Jun. 23, 2010.
Baumann, Andrew, et al., "The Multikernel: A New OS Architecture for Scalable Multicore Systems," Oct. 2009, SOSP'09, Oct. 11-14, 2009, Big Sky, Montana, USA, pp. 29-43.
Crawford et al. "Accelerating Computing with the Cell Broadband Engine Processor"; CF'08, May 5-7, 2008; Ischia, Italy; Copyright 2008 ACM 978-1-60558-077.
Darren Abramson et al.; "Intel Virtualization Technology for Directed I/O"; Intel Technology Journal, vol. 10, Issue 3, Aug. 10, 2006; pp. 1-16.
Huang, Wei et al., "A Case for High Performance Computing with Virtual Machines," ISC '06, Jun3 28 30, Carins, Queensland, Australia, pp. 125-134, Jun. 3, 2006.
"Intel (registered trademark) Itanium (registered trademark) Architecture Software Developer's Manual," vol. 2, Rev. 2.2, Jan. 2006.
"z/VM: General Information Manual," IBM Publication No. GC24-5991-05, May 2003.
"DMA Engines Bring Mulicast to PCI Express Systems," http://electronicdesign.com, Aug. 13, 2009, 3 pages.
"I/O Virtualization and AMD's IOMMU," AMD Developer Central, http://developer.amd.com/documentation/articles/pages. 892006101.aspx, Aug. 9, 2006.
"IBM Enhances the IBM eServer zSeries 990 Family of Servers," Hardware Announcement, Oct. 7, 2003, pp. 1-11.
Internet Article, "Large Page Support in the Lunux Kernel," http://lwn.net./Articles/6969/<retrieved on Jan. 26, 2010>.
K. Vaidyanathan et al.; "Exploiting RDMA Operations for Providing Efficient Fine-Grained Resource Monitoring in Cluster-Based Servers"; Jun. 2006; pp. -10; Downloaded: Apr. 13,2010 at 18:53:46 UTC from IEEE Xplore. 1-4244-0328-6/06.
Mysore, Shashidhar et al., "Understanding and Visualizing Full Systems with Data Flow Tomography" SPOLOS '08, Mar. 1-5, 2008, Seattle, Washington, USA, pp. 211-221.
Narayanan Ganapathy et al.; Papers-USENIX Annual Teleconference (No. 98); Entitled: "General Purpose Operating System Support for Multiple Page Sizes" 1998; pp. 1-9.
U.S. Appl. No. 12/821,221, Non-Final Office Action mail date Jan. 10, 2011.
Paulsen, Erik; "Local Memory Coaxes Top Speed from SCSI Masters"; Electronic Design, v. 41, (Apr. 15, 1993) p. 75-6+.
Swift, Micael M. et al., "Improving the Reliability of Commodity Operating Systems, " ACM Transactions on Computer Systems, vol. 23, No. 1, Feb. 2005, pp. 77-110.
Talluri et al., "A New Page Table for 64-bit Address Spaces," ACM SIGOPs Operating Systems Review, vol. 29, Issue 5 (Dec. 1995), pp. 194-200.
VTdHowTo—Xen Wiki; Downloaded—Apr. 16, 2010; pp. 1- 5; http://wiki.xensource.com/xenwiki/VTdHowTo.
Winwood, Simon, et al., "Multiple Page Size Support in the Linux Kernel", Proceedings of Ottawa Linux Symposium, 2002.
Xu, Min et al., "Towards a VMM-based Usage Control Framework for OS Kernel Integrity Protection," SACMAT '07, Jun. 20-22, 2007, Sophia Antipolis, France, pp. 71-80.
z/Architecture Principles of Operation, Feb. 2009; pp. 1-1344.
z/VM: Running Guest Operating Systems, IBM Publication No. SC24-5997-02, Oct. 2001.
Dolphin Interconnect Solutions; MySQL Acceleration Solutions; Solid State Storage; Embeded and HPC Solutions; "DXH510 PCI Express Host Adapter"; ww.dolphinics.com/products/pent-dxseries-dsh510.html downloaded Jun. 10, 2010.
J. Regula, "Using Non-transparent Bridging in PCI Express Systems", PLX Technology, Inc., pp. 1-31; Jun. 1, 2004.
Jack Regula "Ethernet Tunneling through PCI Express Inter-Processor Communication, Low Latency Storage IO Source"; www.wwpi.com; Publisher: Computer Technology Review; Jan. 19, 2009.
Robert F. Kern, "IBM System z & DS8000 Technology Synergy", IBM ATS Americas Disk Storage; Jul. 21, 2009, pp. 1-25.
Szwed et al.; "Managing Connected PCI Express Root Complexes"; Dated: Dec. 23, 2009—6 pages.
U.S. Appl. No. 12/821,124, filed Jun. 23, 2010, entitled "Automatic Construction of Human Interaction Proof Engines".
U.S. Appl. No. 12/821,181, filed Jun. 23, 2010, entitled "Controlling the Selectively Setting of Operational Parameters for an Adapter".
U.S. Appl. No. 12/821,182, filed Jun. 23, 2010, entitled "Load Instruction for Communicating With Adapters".
U.S. Appl. No. 12/821,185, filed Jun. 23, 2010, entitled "Discovery by Operating System of Information Relating to Adapter Functions Accessible to the Operating System".
U.S. Appl. No. 12/821,191, filed Jun. 23, 2010, entitled "Managing Processing Associated With Hardware Events".
International Search Report for PCT/EP2011/059810, Sep. 14, 2011, pp. 1-9.
Final Office Action for U.S. Appl. No. 12/821,221, entitled "SERVER DRAWER" pp. 1-21.
Non Final Office Action for U.S. Appl. No. 12/821,243, entitled "Upbound Input/Output Expansion Request and Response Processing in a PCIA Architecture" pp. 1-37.
Non Final Office Action for U.S. Appl. No. 12/821,256, entitled "Switch Failover Control in a Multiprocessor Computer System " pp. 1-46.
Non-final Office Action for U.S. Appl. No. 12/821,250, entitled "Covery of Logical Images At Storage Area Network Endpoints" pp. 1-39.
Non Final Office Action for U.S. Appl. No. 12/821,221, entitled "SERVER DRAWER" pp. 1-15.
Non-final office Action received for U.S. Appl. No. 12/821,239 dated Nov. 8, 2012.
Final Office Action dated Aug. 3, 2012 for U.S. Appl. No. 12/821,245.
Non-final Office Action dated Sep. 26, 2012 for U.S. Appl. No. 12/821,243.
Final Office Action dated Sep. 13, 2012 for U.S. Appl. No. 12/821,256.
Final Office Action received Oct. 10, 2012 for U.S. Appl. No. 12/821,221.
Non-final Office Action received Oct. 11, 2012 for U.S. Appl. No. 12/821,247.
Notice of Allowance dated Sep. 19, 2012 for U.S. Appl. No. 12/821,224.
Final Office Action dated Jul. 19, 2012 for U.S. Appl. No. 12/821,250.
Final Office Action dated Jun. 14, 2013 for Application U.S. Appl. No. 12/821,239, 14 pages.
Informational Materials for IDS, date May 8, 2013, 4 pages.
International Search Report of the Patent Cooperation Treaty for International Application No. PCT/CN2013/070828, mailing date Apr. 24, 2013, 13 pages.

* cited by examiner

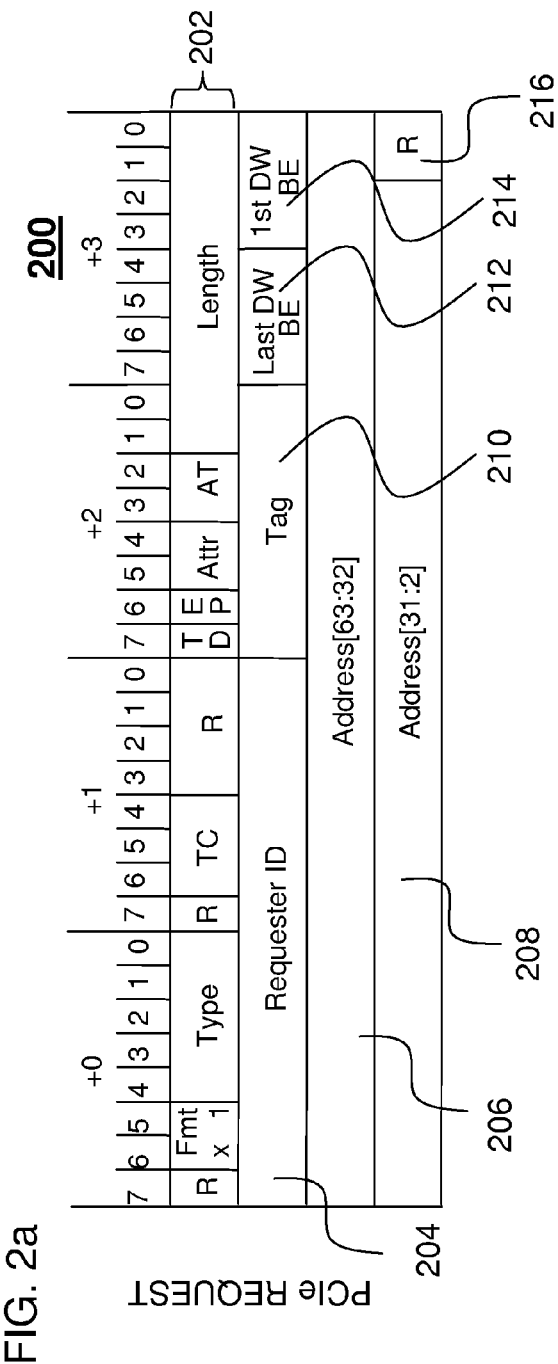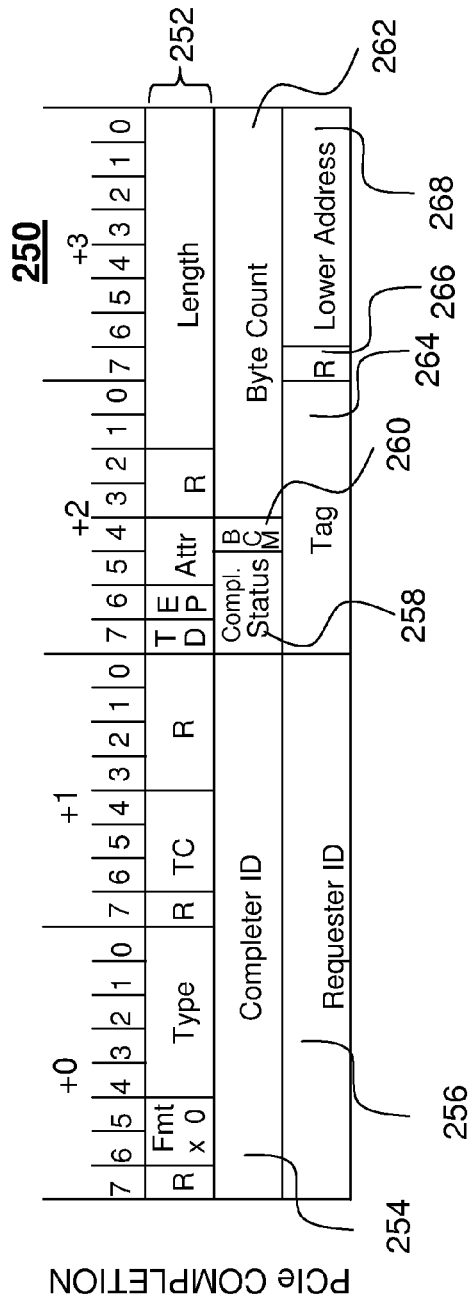
FIG. 2a PCIe REQUEST
FIG. 2b PCIe COMPLETION

US 8,615,622 B2

NON-STANDARD I/O ADAPTERS IN A STANDARDIZED I/O ARCHITECTURE

BACKGROUND

This invention relates generally to processor input/output (I/O) interfacing within a computing environment, and more particularly to downbound processing of I/O expansion requests and responses over a PCIe bus and switch architecture.

The Peripheral Component Interconnect Express (PCIe) is a component level interconnect standard that defines a bi-directional communication protocol for transactions between I/O adapters and host systems. PCIe communications are encapsulated in packets according to the PCIe standard for transmission on a PCIe bus. Transactions originating at I/O adapters and ending at host systems are referred to as upbound transactions. Transactions originating at host systems and terminating at I/O adapters are referred to as downbound transactions. The PCIe topology is based on point-to-point unidirectional links that are paired (e.g., one upbound link, one downbound link) to form the PCIe bus. The PCIe standard is maintained and published by the Peripheral Component Interconnect Special Interest Group (PCI-SIG).

One drawback to the use of PCIe is that all I/O adapters connected to a PCIe bus are required to operate within the parameters defined in the PCIe standard (i.e., they are PCIe compatible I/O adapters). The PCIe standard sets rigid constraints on transactions, completion responses and on transaction packaging and addressing. In some system architectures, for example the IBM® System z® architecture, there is a need to be able to support communications over a PCIe bus between I/O adapters and host systems using transactions that are not supported by the PCIe standard. An example is the ability to communicate with non-PCIe compatible adapters (e.g., I/O expansion adapters), which are typically supporting legacy systems and applications that may be difficult (due, for example to technology issues and/or expense) to convert into the PCIe standard. Thus, while PCIe is suitable for its intended purpose of communicating with PCIe compatible adapters, there remains a need for expanding this capability to allow PCIe to communicate with non-PCIe compatible adapters to support legacy systems.

BRIEF SUMMARY

A system for implementing non-standard I/O adapters in a standardized I/O architecture, the system comprising an I/O hub communicatively coupled to an I/O bus and at least one I/O adapter, the I/O hub including logic for implementing a method, the method comprising receiving a request to perform an operation on the I/O adapter from a requester at a requester address, the I/O adapter at a destination address, determining that the request is in a format other than a format supported by the I/O bus, the I/O bus expecting a requester identifier at a first location in a header of the request, reformatting the request into the format supported by the I/O bus, the reformatting comprising storing the requester address, the destination address and an operation code at the first location in the header of the reformatted request, and sending the reformatted request to the I/O adapter.

A method for implementing non-standard I/O adapters in a standardized I/O architecture, the method comprising receiving at an I/O hub a request to perform an operation on an I/O adapter from a requester at a requester address, the I/O adapter at a destination address, determining that the request is in a format other than a format supported by an I/O bus, the I/O bus expecting a requester identifier at a first location in a header of the request, reformatting the request into the format supported by the I/O bus, the reformatting comprising storing the requester address, the destination address and an operation code at the first location in the header of the reformatted request, and sending the reformatted request to the I/O adapter.

A system for implementing non-standard I/O adapters in a standardized I/O architecture, the system comprising an I/O adapter communicatively coupled to an I/O bus, an I/O hub communicatively coupled to the I/O bus, the I/O hub including logic for implementing a method, the method comprising receiving a response, the response generated by a responder to indicate a completion of a request, the responder at an address, the request initiated by the I/O adapter, and determining that the response is in a format other than a format supported by the I/O bus, the I/O bus expecting a completer identifier at a first location in a header of the response. The method further comprising reformatting the response into the format supported by the I/O bus, the reformatting comprising storing an identifier of the address of the responder, and a response code at the first location in the header of the reformatted response, sending the reformatted response to the I/O adapter and receiving the reformatted response at the I/O adapter.

A method for implementing non-standard I/O adapters in a standardized I/O architecture, the method comprising receiving a response at an I/O adapter, the response generated by a responder to indicate a completion of a request, the responder at an address, the request initiated by the I/O adapter and determining that the response is in a format other than a format supported by an I/O bus, the I/O bus expecting a completer identifier at a first location in a header of the response. The method further comprising reformatting the response into the format supported by the I/O bus, the reformatting comprising storing an identifier of the address of the responder, and a response code at the first location in the header of the reformatted response, sending the reformatted response to the I/O adapter and receiving the reformatted response at the I/O adapter.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE SEVERAL VIEWS OF THE DRAWINGS

Referring now to the drawings wherein like elements are numbered alike in the several FIGURES:

FIG. 2a depicts a block diagram of a PCIe request header;

FIG. 2b depicts a block diagram of a PCIe completion header;

DETAILED DESCRIPTION

An exemplary embodiment of the present invention provides for processing of I/O expansion requests and responses in a PCIe architecture without requiring modification of the PCIe bus and PCIe switch infrastructure.

Figure 1:
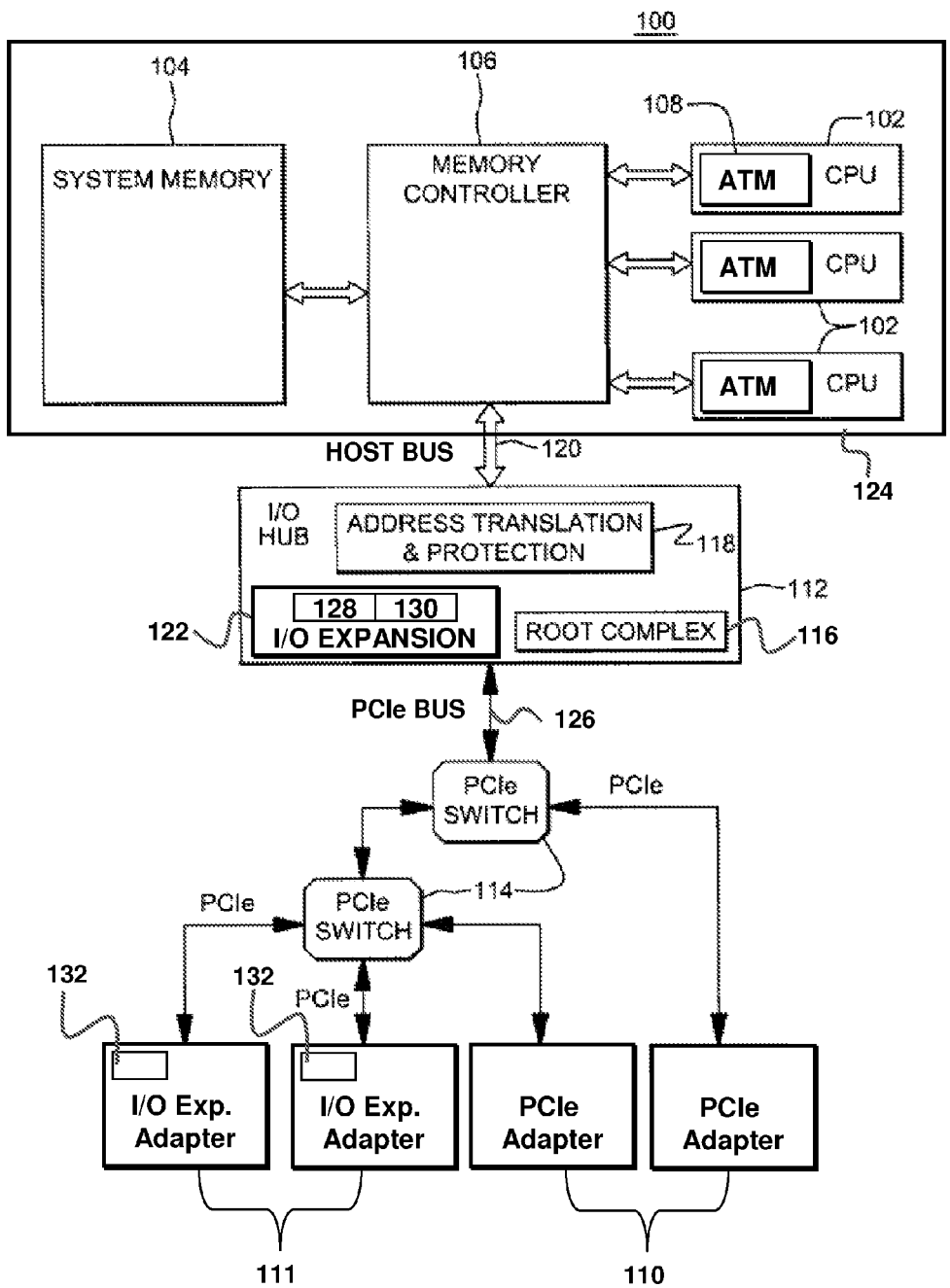
FIG. 1 depicts a block diagram of a computer system that may be implemented in an exemplary embodiment.

FIG. 1 depicts a computer system 100 that may be implemented by an exemplary embodiment of the present invention. In an embodiment, the computer system 100 is a System z® server offered by International Business Machines Corporation (IBM®). System z is based on the z/Architecture® offered by IBM. Details regarding the z/Architecture are described in an IBM publication entitled, "z/Architecture Principles of Operation," IBM Publication No. SA22-7832-07, February 2009, which is hereby incorporated herein by reference in its entirety.

In an exemplary embodiment, computer system 100 includes one or more central processing units (CPUs) 102 coupled to a system memory 104 via a memory controller 106. System memory 104 is accessed when a CPU 102, PCIe adapter 110, or I/O expansion adapter 111 issues a memory request (read or write) that includes an address used to access the system memory 104. The address included in the memory request is typically not directly usable to access system memory 104, and therefore, it requires translation to an address that is directly usable in accessing system memory 104. In an embodiment, the address is translated via an address translation mechanism (ATM) 108. In an embodiment, the ATM 108 translates the address from a virtual address to a real or absolute address using, for example, dynamic address translation (DAT).

The memory request, including the translated address, is received by the memory controller 106. In an embodiment, the memory controller 106 maintains consistency in the system memory 104 and arbitrates between requests for access to the system memory 104 from hardware and software components including, but not limited to, the CPUs 102, the PCIe adapters 110, and the I/O expansion adapters 111 known collectively as I/O adapters.

In an exemplary embodiment, the PCIe adapters 110 perform one or more PCIe I/O functions; and the I/O expansion adapters 111 are not PCIe compatible and perform one or more non-PCIe I/O functions. A memory request that is sent from one of the CPUs 102 to the PCIe adapters 110 or the I/O expansion adapters 111 (i.e., a downbound memory request) is first routed to an I/O hub 112 (e.g., a PCIe hub also referred to herein as an I/O hub), which is connected to a PCIe bus 126 (also described herein as an I/O bus). The memory request is then sent from the PCIe bus 126 to one of the PCIe adapters 110 or to one of the I/O expansion adapters 111 via one or more PCIe switches 114. The PCIe bus 126 and PCIe switches 114 communicate in a standard PCIe format (or protocol) as is known in the art.

In an exemplary embodiment, the I/O hub 112 includes one or more state machines, and I/O expansion logic 122 for interpreting and transmitting I/O expansion operations, bi-directionally, between the host system 124 and the I/O expansion adapters 111. The host system 124 transmits requests to the I/O expansion adapters 111 in a format supported by the I/O expansion adapters 111 but incompatible (i.e. not supported) by the PCIe bus 126 and the PCIe switches 114. The I/O expansion logic 122 receives requests and responses from the host system 124 via the host bus 120 and transforms them into a format supported by the PCIe bus 126. As depicted in FIG. 1, the I/O expansion logic 122 includes both downbound expansion logic 128 and upbound expansion logic 130 which are shown as separate logic blocks, however portions or all of the logic within these blocks may overlap. The I/O hub 112 depicted in FIG. 1 also includes a root complex 116 that receives request and completions from one of the PCIe switches 114. Memory requests include an I/O address that may need to be translated, and thus, the I/O Hub 112 provides the address to an address translation and protection unit (ATP unit) 118. The ATP unit 118 is used to translate, if needed, the I/O address into to an address directly usable to access system memory 104.

An upbound memory request initiated from one of the PCIe adapters 110 or I/O expansion adapters 111, including the address (translated or initial address, if translation is not needed), is provided to the memory controller 106 via, for instance, the host bus 120. The memory controller 106 performs arbitration and forwards the memory request with the address to the system memory 104 at the appropriate time to the system memory 104.

In an exemplary embodiment, a memory request is initiated by one of the PCIe adapters 110, by one of the I/O expansion adapters 111, or by the host system 124. In an exemplary embodiment, there are two types of memory requests, posted requests and non-posted requests. Non-posted requests (e.g. memory reads) return a response called a completion that contains the requested data and information related to the status of the result of processing the associated memory request as will be described in more detail below. Posted transactions (e.g. memory writes) are similar to non-posted transactions except that the data is the payload and posted transactions do not return a completion packet. Therefore, any error that occurs during the posted transaction will be unknown to the requester. Both posted and non-posted requests flow through the PCIe infrastructure based on address information contained in their headers as will be described in more detail below.

While PCI defines only Memory Read and Posted Memory Write requests from the PCIe adapters 110 to the root complex 116, System z uses several higher function requests not defined by the PCI specification. All of these requests are various types of atomic requests used for locking protocols and bit manipulation.

One request is called Test and Set. This request operates like a memory read and includes a lock byte and a memory address. If the first byte of the target address (8 byte aligned) is zero, the lock byte is written into this first byte. The target data, up to 256 bytes in this implementation, is returned to the requester. A second request is called Test and Store. This request operates like a Memory Write with a payload of up to 256 bytes in this implementation. It differs from a Memory Write in that the first byte of the payload is used as a lock byte. If the first byte in the target address is zero, the payload is written into the target address. If the first byte in the target address is not zero, the payload is not written into the target address, and a response is generated indicating that the first target byte was not zero.

Three other requests manipulate bits in memory and one also causes an interruption. All three operate like Memory Write requests, and all three include a mask to indicate which target bits should be set or reset. In this implementation, the mask is 8 bytes. The Set Bit Request sets bits indicated by the mask at the target in memory. The Reset Bit Request resets bits indicated by the mask at the target memory. The Set Bit with Interrupt Request first sets bits indicated by the mask at the target in memory and then causes an interruption to the host processor.

Turning now to FIGS. 2a and 2b, a standard PCIe request and completion header will be described. A typical PCIe memory request includes a header, and if the request is a write, it also includes payload data. A typical PCIe memory completion for a read request includes a header and payload data. The standard PCIe request header 200 comprises a plurality of fields. As shown in the embodiment in FIG. 2a, the first 4 bytes 202 of the standard 64 bit address PCIe request header 200 includes 8 reserved bits indicated by "R," a format field describing the address length (32 or 64 bits) and whether the packet is a request or completion, a traffic class field ("TC"), a transaction layer packet digest ("TD"), a poison bit ("EP"), attributes ("Attr"), address type (AT), length in 4 byte increments, a requester ID field 204 and a tag field 210 which together comprise the transaction ID, and last and first doubleword byte enables (Last DW BE and 1$^{st}$ DW BE). The requester ID field 204 includes information used by the routing mechanisms of the computer system 100 to identify the source of the request and to route a response, if provided, to the requester. The address field (206 and 208) comprises a set of high order bits 206 and a set of low order bits 208. Taken together the address field (206 and 208) indicates either the address of the PCIe adapter 110 or I/O expansion adapter 111 to which the request is directed for a downbound transaction, or the system memory address of the system memory 104 for an upbound transaction.

The completion packet generally comprises a header and payload (not shown) segment. FIG. 2b depicts a standard PCIe completion header 250. The first bytes 252 of the PCIe completion header 250 includes 9 reserved bits indicated by "R," a Format field describing the address length (32 or 64 bits) and whether the packet is a request or completion, a traffic class field ("TC"), a transaction layer packet digest ("TD"), a poison bit ("EP"), attributes (Attr), length in 4 byte increments, a completer ID 254, completion status 258, byte count modified 260 ("BCM"), a byte count 262, a requester ID 256 and tag field 264 which comprises the transaction ID of the request, and the low order address 268 indicating the starting point of the payload data. The completer ID field 254 is the identification of the PCIe adapter 110 or I/O expansion adapter 111 or host that performed the completion. The requester ID 256 and tag 264 of the PCIe completion header 250 contains the requester ID 204 and tag 210 of the PCIe request header 200 to match memory completions to their corresponding memory requests. The requester ID 256 is used to route the completion information back to the originator of the memory request. The PCIe completion header 250 also includes a completion status field 258 for indicating if the request was completed successfully or if an error occurred while the adapter (PCIe adapter 110 or I/O expansion adapter 111) or host was processing the request.

Figure 3:
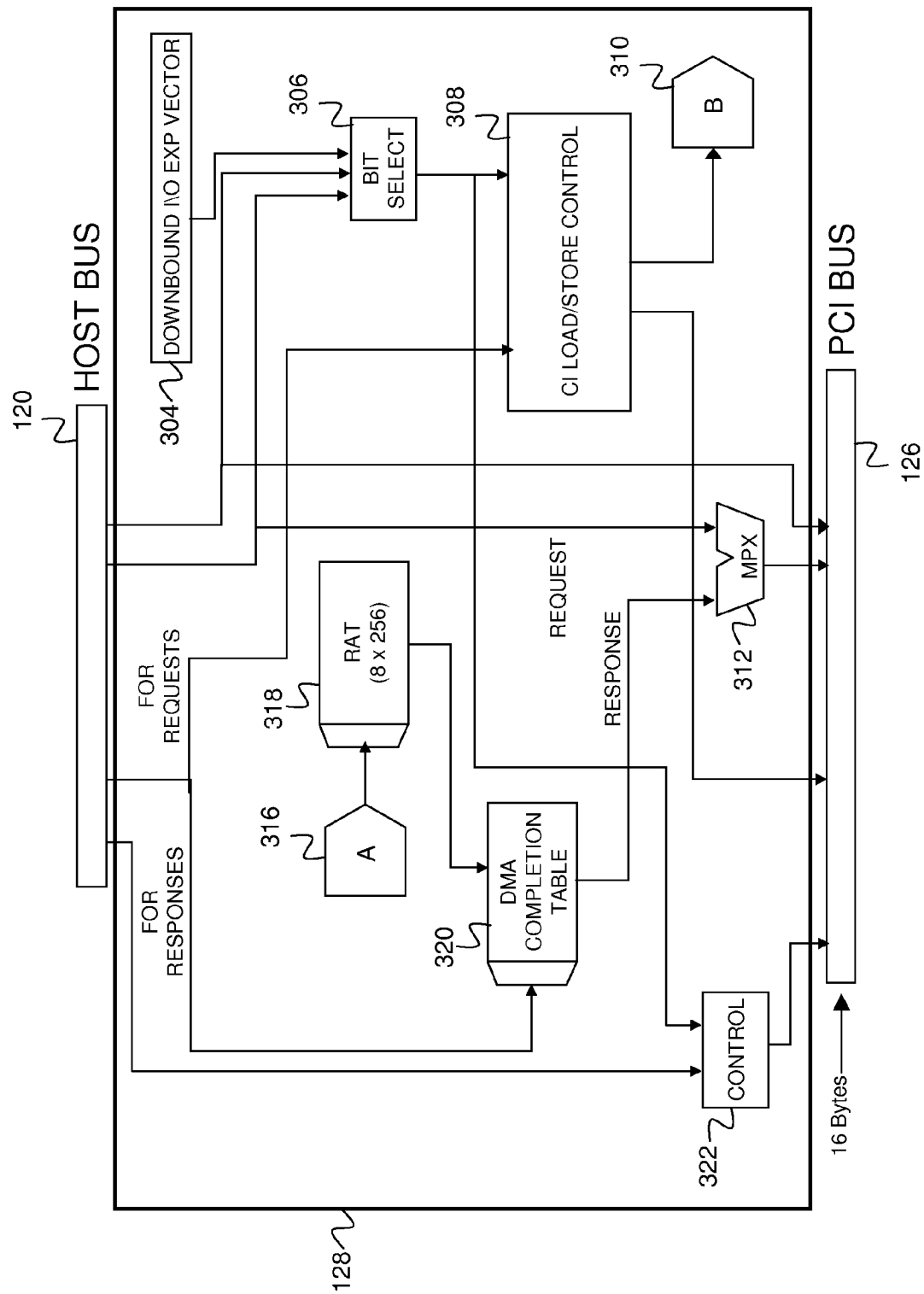
FIG. 3 depicts a block diagram of an exemplary embodiment of I/O expansion logic for downbound request and completion processing.

Turning now to FIG. 3, an exemplary embodiment of the downbound expansion logic 128 (part of I/O expansion logic 122) depicted in FIG. 1 for interpreting and transmitting I/O expansion operations from the host bus 120 to the PCIe bus 126 will be described. I/O expansion operations include a plurality of memory requests (also referred to herein as "downbound requests") and a plurality of responses (also referred to herein as "downbound responses"). The host bus 120 connects the host system 124 to the I/O hub 112 of FIG. 1 and provides transport services for directing requests and responses from the host system 124 to the PCIe adapters 110 and the I/O expansion adapters 111. The I/O expansion adapters 111 operate in a communication format which is incompatible (i.e. not supported) with the PCIe standard format used by the PCIe bus 126, therefore, transformation logic 132 executes within the I/O expansion adapters 111 to enable communication to the PCIe bus 126. The transformation logic 132 transforms (i.e. reformats) requests and responses in the I/O expansion adapter 111 to a format that can be interpreted by the PCIe bus 126. In an exemplary embodiment, the transformation logic 132 executes in logic circuits on the I/O expansion adapter 111. In an alternate embodiment, the transformation logic 132 executes on one or more specialized hardware circuits communicatively coupled to the I/O expansion adapters 111 and the PCIe bus 126. In an additional alternate embodiment, the transformation logic 132 executes as software in the I/O expansion adapter 111. Although downbound requests and downbound responses are operations that are both initiated by the host system 124, different process flows in the downbound expansion logic 128 are used to process each of the operations.

In an exemplary embodiment, a downbound request is placed onto the host bus 120. After a downbound request is placed on the host bus 120, the I/O hub 112 of FIG. 1 collects the downbound request and passes it to the downbound expansion logic 128. The downbound expansion logic 128 provides routing and transformation services based on information contained in the memory request. A downbound I/O expansion vector 304 is used to determine if the downbound request is being sent to one of the I/O expansion adapters 111 of FIG. 1. The downbound I/O expansion vector 304 retrieves information from a header of the downbound request, and using bit select logic 306 determines the destination of the downbound request. A cache inhibited (CI) load/store control 308 stores information related to downbound requests, such as a portion of the host address indicating the target I/O expansion adapter 111 and an operation code, if the host system 124 has indicated a response is required.

In an exemplary embodiment, a downbound request that is bound for one of the I/O expansion adapters 111 of FIG. 1 is transformed into a PCIe compatible downbound request by a multiplexor 312. In an additional embodiment, the CI load/store control 308 sets the opcode in the header of the memory request that is sent from the I/O hub 112 to the PCIe bus 126, this data is used to process an upbound response at block 310 as will be described in more detail in reference to FIG. 4.

In an exemplary embodiment, a downbound response is initiated from the host system 124 in response to completing a request from one of the I/O expansion adapters 111. The downbound response is placed on the host bus 120 and is collected by the I/O hub 112 and passed to the downbound expansion logic 128. A DMA completion table 320, as depicted in FIG. 3, contains records for all requests that are awaiting responses. In an exemplary embodiment the records in the DMA completion table 320 are updated to include information required to forward the downbound response from the host system 124 to the I/O expansion adapter 111. A response address table (RAT) 318 is used to lookup downbound response routing information. The address information is stored for requests sent from the I/O expansion adapters 111 to the host bus 120 (also referred to herein as "upbound requests") as they are processed, as will be described in more detail below. The upbound processing logic transmits the address data to the RAT 318 at the appropriate processing step at block 316 as will be described in more detail below in reference to FIG. 4. Control logic 322 adds an operation code (also referred to herein as "opcode") to the downbound response which is used by the I/O expansion adapters 111 to process the downbound response. In an exemplary embodiment the downbound expansion logic 128 is implemented in hardware circuits in the I/O hub, however, it will be understood that in alternate embodiments the downbound expansion logic may be executed as software in the hub or as a combination of hardware and software executing on the hub or other logic circuits as is known in the art.

Figure 4:
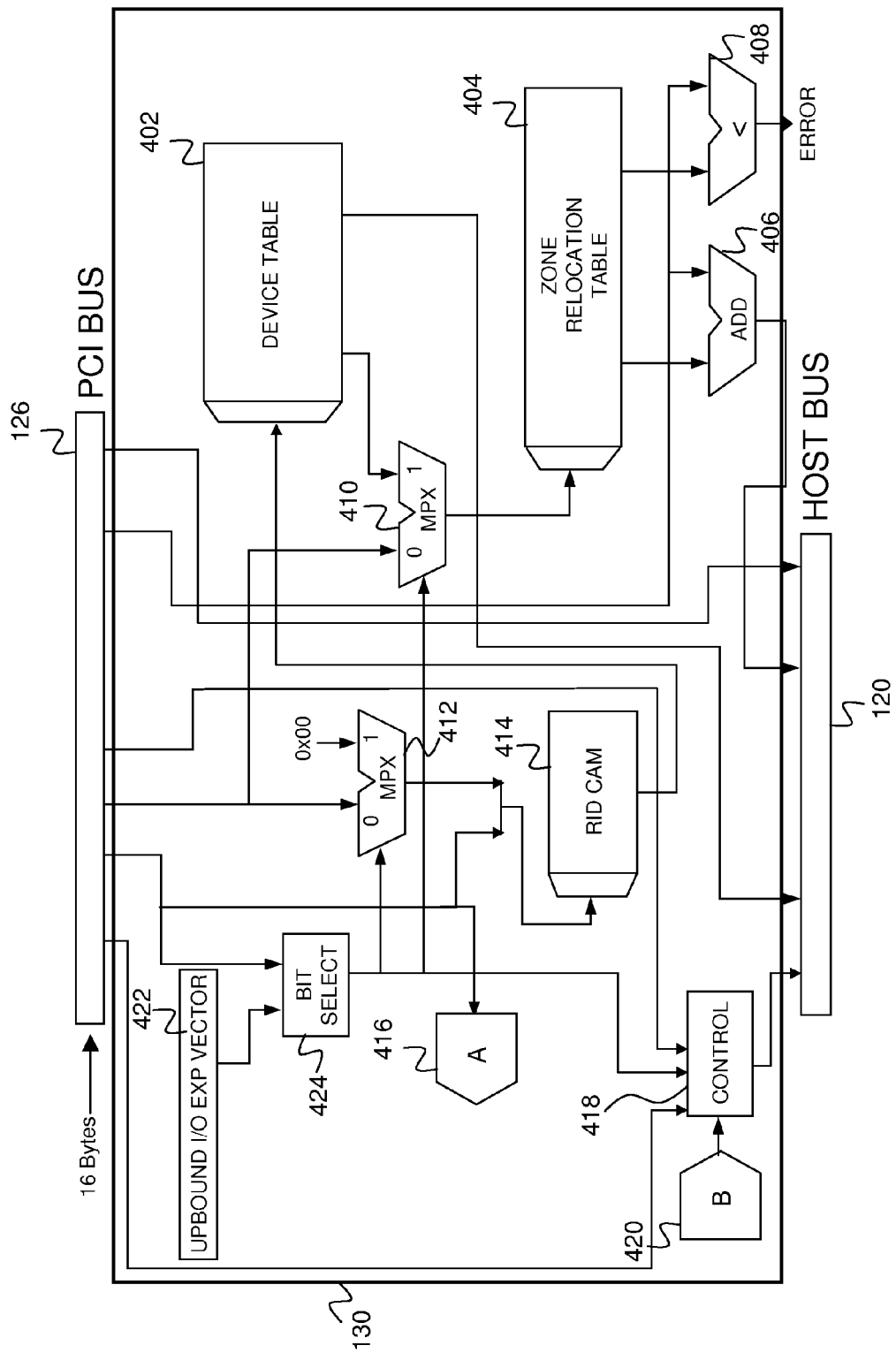
FIG. 4 depicts a block diagram of an exemplary embodiment of I/O expansion logic for upbound request and completion processing.

Turning now to FIG. 4, an exemplary embodiment of the upbound expansion logic 130 (part of I/O expansion logic 122) depicted in FIG. 1 for interpreting and transmitting I/O expansion operations from the PCIe bus 126 to the host bus 120 will be described. These I/O expansion operations include a plurality of requests (also referred to herein as "upbound requests") and a plurality of responses (also referred to herein as "upbound completions"). Both upbound requests and upbound completions are initiated by one ore more of the I/O expansion adapters 111. An upbound I/O expansion vector 422 is used to determine if the upbound request is being sent from one of the I/O expansion adapters 111. The upbound I/O expansion vector 422 retrieves information from a header of the upbound request, and using the bit select logic 424 determines the source of the upbound request. Once the source of the upbound request is determined, the address routing information is stored in the RAT 318 of FIG. 3, by transporting the data to the RAT 318 at block 416. A multiplexor 412 is used to extract the requester ID field 204 from the PCIe request header 200 of FIG. 2a from the upbound request. The requester ID field 204 bus number is passed to the RAT 318. The requester ID field 204 including the bus number, device number, and function number is passed from the multiplexor 412 to a requester ID content addressable memory (RID CAM) 414. The RID CAM 414 provides an index into the device table 402. The device table 402 is used to determine the virtual address of a particular function within the I/O expansion adapter 111 of FIG. 1 based on the requester ID field 204. The data extracted from the device table 402 is modified by a multiplexor 410, and the output of the multiplexor 410 is used by a zone relocation table 404 to determine the correct address and partition of the host system 124 for which the request is to be sent. The operation code of the packet is processed by control logic 418 and is transformed into the appropriate I/O expansion operation code before being transmitted to the host bus 120.

In an exemplary embodiment, the upbound completions are processed as described above, however, the control logic 418 matches the upbound completion with a downbound request using data transmitted to it from the CI load/store control 308 at block 420 when the downbound request was processed as described above.

Figure 5:
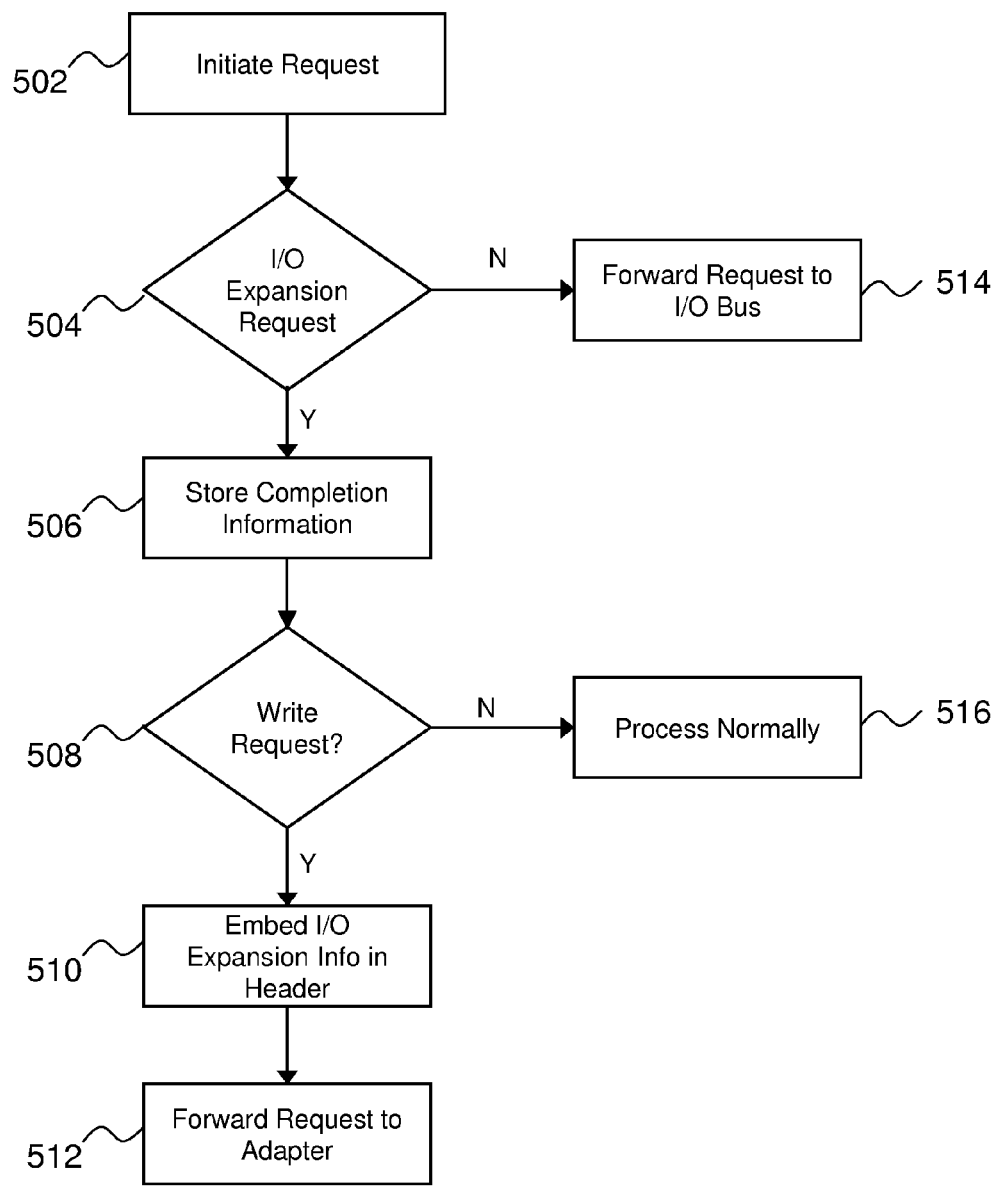
FIG. 5 depicts a process flow of an exemplary embodiment of I/O expansion logic for processing a downbound request.

Turning now to FIG. 5, a detailed block diagram of an exemplary embodiment of a downbound I/O expansion request processing flow will now be described. In an exemplary embodiment, the downbound I/O expansion request processing flow executes in the I/O expansion logic 122 of the I/O hub 112 of FIG. 1 and transforms a downbound request (or downbound transaction) into the format of the PCIe request header 200 of FIG. 2a. In an exemplary, the downbound request received on the host bus 120 includes an opcode to identify the type of request, an address to identify the destination of the request, a tag to identify the particular request so that the response can be associated with the request, and a length field to specify the payload size, if any. At block 502, the host system 124 of FIG. 1 initiates a request for an operation to be executed on one of the PCIe adapters 110 of FIG. 1 or one of the I/O expansion adapters 111 of FIG. 1. At block 504, the request is received at the I/O hub 112 and is processed by the I/O expansion logic 122. The downbound I/O expansion vector 304 of FIG. 3 is used to determine if the request is directed to one of the I/O expansion adapters 111 or to one of the PCIe adapters 110. If the request is directed to one of the PCIe adapters 110, then the I/O hub 112 forwards the request to the PCIe bus 126 of FIG. 1. Otherwise, if the request is directed to one of the I/O expansion adapters 111, the bit select logic 306 of FIG. 3 extracts the destination information and host TAG of the request and passes the information to the CI load/store control 308 of FIG. 3. At block 506, the CI load/store control 308 saves the request information including the portion of the address identifying the destination address of the request (slot and sub-slot number), the host TAG of the request, and the opcode to the control block 418 of FIG. 4. At block 508, the request is inspected to determine if it is a write request by reviewing the operation code of the request. If the operation is not a write request, the request is transmitted to the PCIe bus 126 of FIG. 1 which transmits it to the I/O expansion adapter 111. These requests include memory reads, configuration reads and writes, and I/O space reads and writes. In all these cases, the I/O expansion adapter will respond just like any standard I/O adapter with a completion packet. If the request is a write request, the I/O expansion logic 122 transforms the request into a format supported by the PCIe bus 126 and embeds the information specific to the I/O expansion adapter 111 in the header of the newly formatted request.

Figure 6:
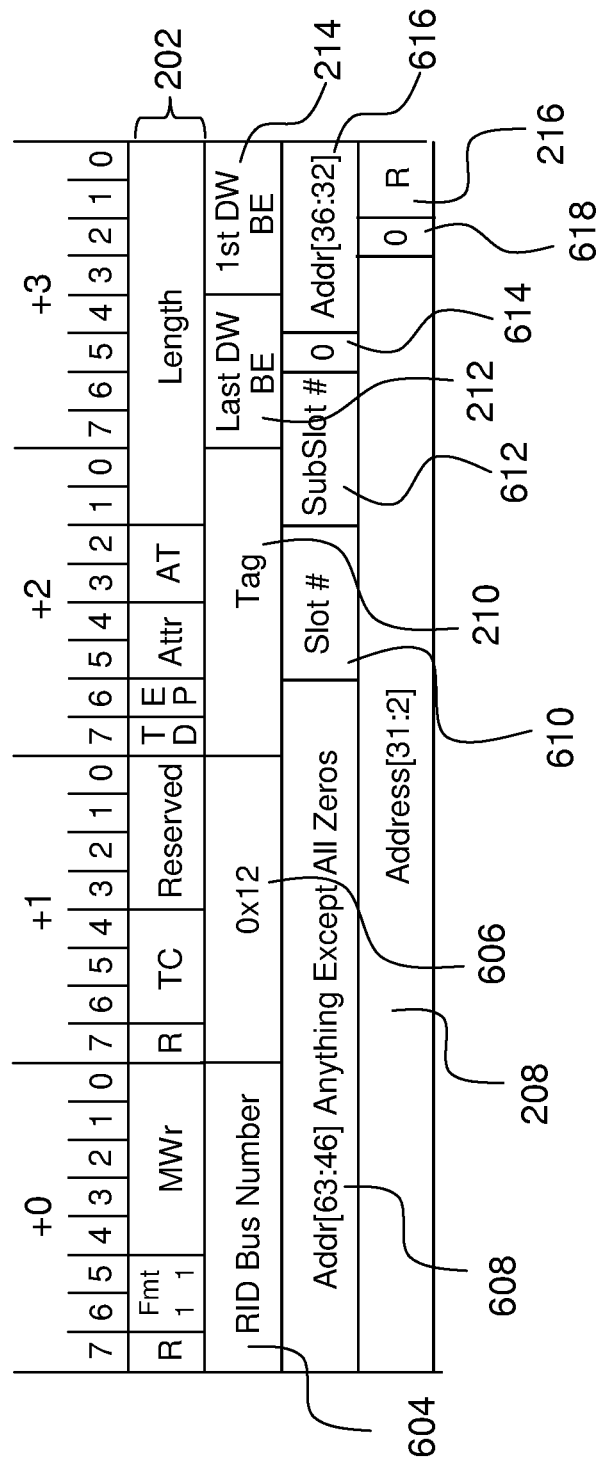
FIG. 6 depicts a block diagram of a transformed PCI request header.

At block 510, I/O expansion information is embedded in a transformed PCIe request header, such as the transforms PCI request header 600 depicted in FIG. 6. The first 4 bytes of the PCIe request header 202 remain unchanged and function in the same way as described above with regard to FIG. 2a. As shown in FIG. 6, the requester ID field 204 of FIG. 2a is replaced with two new fields, a request ID bus number field 604 and an operation code field 606. The request ID bus number field 604 is the PCI bus number of the host root complex. The operation code field 606, is used to indicate the type of request that is being issued by the host system 124, and is used by one of the I/O expansion adapters 111 to indicate the operation that it should perform. The high order bits of the address field 206 of FIG. 2a, are a slot number field 610 for indicating which of the I/O expansion adapters 111 the request is to be sent to. An additional segment of the high order bits of the address field 206 are a sub slot number 612 for indicating which function within the I/O expansion adapter 111 will be used to process the request. An additional bit 614 of the high order bits of the address field 206 is a flag 614 for indicating if a response to the request is required. The remaining segments including the high order bits of the address field 206 (fields 608 and 616) are left unchanged. The low order bit of the address field 208 is set to zero 618 because the I/O expansion requests are on 8 byte boundaries. In alternate embodiments the I/O expansion request boundaries are include a larger or smaller number of bytes. Although specific modifications have been described, it will be understood that other fields or values in the request header could be modified or added in alternate embodiments while still preserving the functions described above.

Returning now to block 512 of FIG. 5, once the PCIe request header has been formatted to embed the I/O expansion transaction information into a PCI formatted request, the request, including the transformed PCIe request header 600, is sent to the destination I/O expansion adapter 111 and is processed by the I/O expansion adapter 111.

Figure 7:
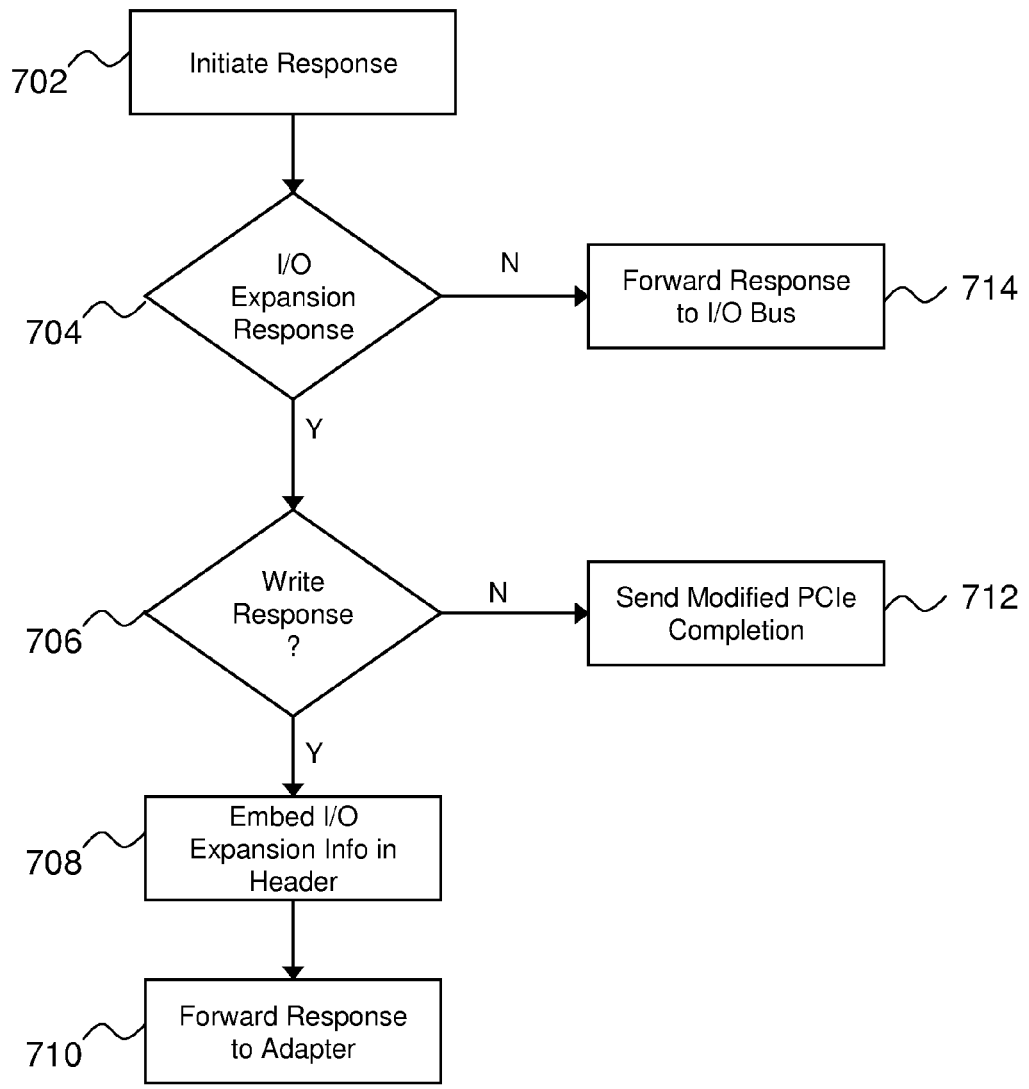
FIG. 7 depicts a process flow of an exemplary embodiment of I/O expansion logic for processing a downbound response.

Turning now to FIG. 7, a detailed block diagram of an exemplary embodiment of a downbound I/O expansion response processing flow will now be described. In an exemplary embodiment, the downbound I/O expansion response processing flow executes in the I/O expansion logic 122 of the I/O hub 112 and transforms a downbound response into the format of the PCIe completion header 250 of FIG. 2b. At block 702, the host system 124 of FIG. 1 initiates a response to a request that was previously requested by one of the PCIe adapters 110 of FIG. 1 or one of the I/O expansion adapters 111 of FIG. 1. At block 704, the response is received at the I/O hub 112 of FIG. 1 and is processed by the I/O expansion logic 122 of FIG. 1. The DMA completion table 320 is used to determine if the response is directed to one of the I/O expansion adapters 111, or to one of the PCIe adapters 110. The data in the DMA completion table is loaded by the hardware when the request is presented to the host system 124. If the response is directed to one of the PCIe adapters 110 and the response is not for a posted memory write request, then the I/O hub 112 forwards the request to the PCIe bus 126 of FIG. 1. If the response is directed to one of the PCIe adapters 110 and the response is for a posted memory write request, then the I/O hub 112 discards the response. Otherwise, at block 706, it is determined if the response is to a write request. If the response is directed to one of the I/O expansion adapters 111 and the response of for a memory read request, the DMA completion table 320 of FIG. 3 extracts the requester ID 256 of the response. If the response is directed to one of the I/O expansion adapters 111 and the response of for a memory write request, the DMA Completion Table 320 of FIG. 3 extracts the address of the requester, previously provided form the RAT 318 to generate a posted memory write request used as the response to the I/O expansion adapters 111. The RAT 318 is initialized by firmware as the I/O expansion adapters 111 come on line. At block 708, it is determined if the response is the result of a write request. If the response is not the result of a write request, at block 712, the requester ID field 256 and the tag 264 of the PCIe completion header 250 is replaced with a completer ID bus number (not shown) which is the bus number of the host, and a response code (not shown) with is not part of the standard PCIe format. The modified PCIe completion is placed on the PCIe bus 126 and sent to one of the PCIe adapters 110 or I/O expansion adapters 111. If, however, the response is to a write request, the process continues at block 710 where the control logic 322 of FIG. 3 transforms the incoming request to a format supported by the PCIe bus 126 of FIG. 1 and embeds the information specific to the I/O expansion adapter 111 in the header of the newly formatted request.

Figure 8:
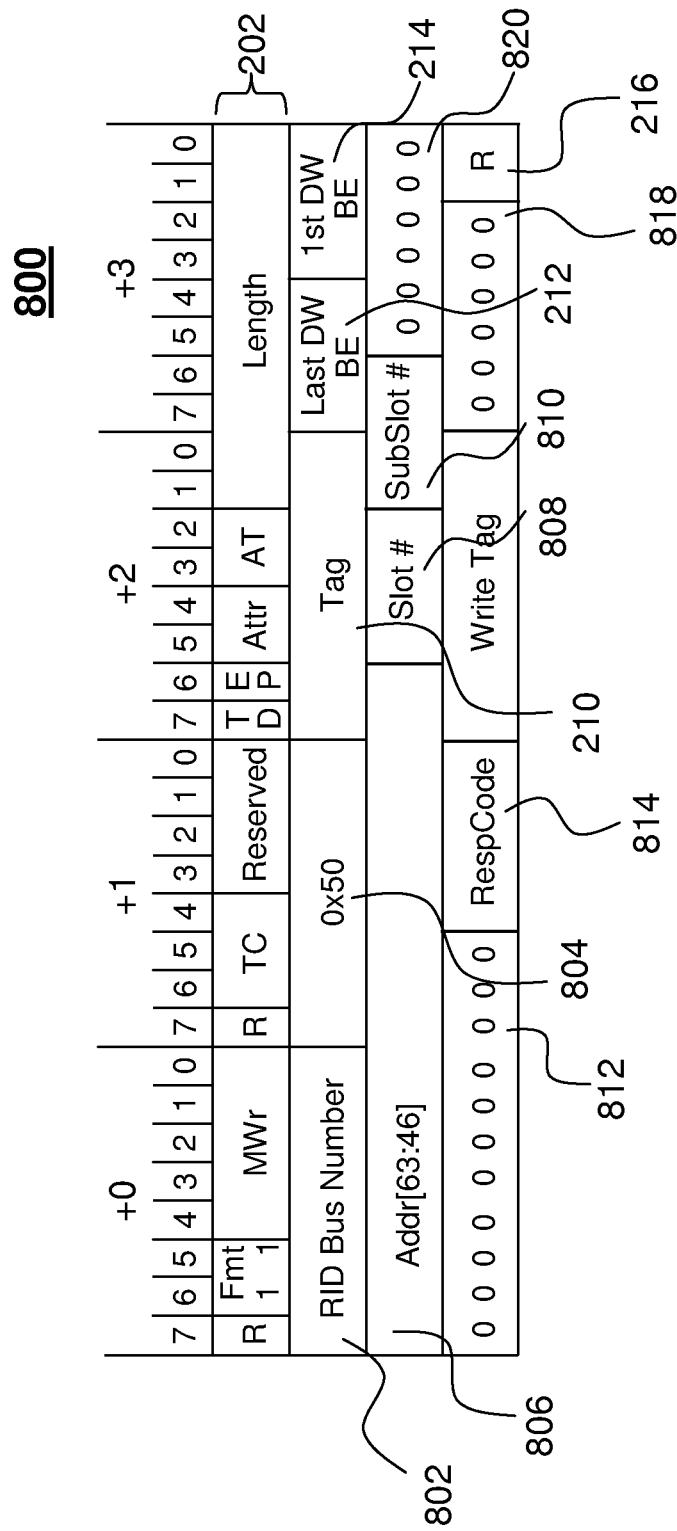
FIG. 8 depicts a block diagram of a transformed PCI response header.

At block 708, I/O expansion information is embedded in a transformed PCIe request header, such as the transformed PCIe request header 800 depicted in FIG. 8. The first 4 bytes of the header 202 of the PCIe request header 200 of FIG. 2a remain unchanged and function in the same way as described above with regard to FIG. 2a. The requester ID field 204 is replaced with the requester ID bus field of the host system 124, and the operation code field 804. The high order bits of the address field 206 are replaced with the slot field 808 and subslot filed 810 which together indicate the adapter which is to receive the response. The low order bits of the address field 208 are replaced with the response code field 814 which indicates the status of the response. Fields 812, 818, and 820 are filler bits. Although specific modifications have been described, it will be understood that other fields or values of the completion transaction could be modified or added in alternate embodiments while still preserving the functions described above.

Returning now to block 710 of FIG. 7, once the transformed PCIe request header 800 has been formatted to embed the I/O expansion transaction information into a PCIe formatted request 200, including the transformed PCIe request header 800, the response is sent to the destination I/O expansion adapter 111 as indicated by the PCI address, and is processed by the I/O expansion adapter 111.

Technical effects and benefits include enabling the use of non-PCIe compatible I/O adapters to be implemented on a PCIe architecture along with PCIe compatible adapters without requiring modifications to the PCIe bus and PCIe switch mechanisms.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As described above, embodiments can be embodied in the form of computer-implemented processes and apparatuses for practicing those processes. In exemplary embodiments, the invention is embodied in computer program code executed by one or more network elements. Embodiments include a computer program product on a computer usable medium with computer program code logic containing instructions embodied in tangible media as an article of manufacture. Exemplary articles of manufacture for computer usable medium may include floppy diskettes, CD-ROMs, hard drives, universal serial bus (USB) flash drives, or any other computer-readable storage medium, wherein, when the computer program code logic is loaded into and executed by a computer, the computer becomes an apparatus for practicing the invention. Embodiments include computer program code logic, for example, whether stored in a storage medium, loaded into and/or executed by a computer, or transmitted over some transmission medium, such as over electrical wiring or cabling, through fiber optics, or via electromagnetic radiation, wherein, when the computer program code logic is loaded into and executed by a computer, the computer becomes an apparatus for practicing the invention. When implemented on a general-purpose microprocessor, the computer program code logic segments configure the microprocessor to create specific logic circuits.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A system for implementing non-standard I/O adapters in a standardized I/O architecture, the system comprising:
    an I/O hub communicatively coupled to an I/O bus and at least one I/O adapter, the I/O hub including logic for implementing a method, the method comprising:
    receiving a request to perform an operation on the I/O adapter from a requester at a requester address, the I/O adapter at a destination address;
    determining that the request is in a non-peripheral component interconnect (PCI) format, the I/O bus expecting a PCI formatted request with a requester identifier at a first location in a header of the request;
    reformatting the request into the PCI format supported by the I/O bus, the reformatting comprising storing the requester address, the destination address and an operation code at the first location in the header of the PCI formatted request; and
    sending the PCI formatted request to the I/O adapter.

2. The system of claim 1, wherein the I/O bus is a PCIe bus.

3. The system of claim 1, wherein the format of the request an I/O expansion format.

4. The system of claim 1, wherein the at least one I/O adapter comprises at least one I/O expansion adapter and at least one PCIe adapter.

5. The system of claim 1, wherein the PCI formatted request is in a format not supported by the I/O adapter and the requester.

6. The system of claim 1, further comprising:
determining that the request is a request to store data; and
storing information about the requester in the I/O hub in response to the determining, the information comprising:
the requester address; and
the operation code, the operation code identifying the operation that is to be performed.

7. A method for implementing non-standard I/O adapters in a standardized I/O architecture, the method comprising:
receiving at an I/O hub a request to perform an operation on an I/O adapter from a requester at a requester address, the I/O adapter at a destination address;
determining that the request is in a non-peripheral component interconnect (PCI) format, the I/O bus expecting a PCI formatted request with a requester identifier at a first location in a header of the request;
reformatting the request into the PCI format supported by the I/O bus, the reformatting comprising storing the requester address, the destination address and an operation code at the first location in the header of the PCI formatted request; and
sending the PCI formatted request to the I/O adapter.

8. The method of claim 7, wherein the I/O bus is a PCIe bus.

9. The method of claim 7, wherein the format of the request an I/O expansion format.

10. The method of claim 7, wherein the at least one I/O adapter comprises at least one I/O expansion adapter and at least one PCIe adapter.

11. The method of claim 7, wherein the PCI formatted request is in a format not supported by the I/O adapter and the requester.

12. The method of claim 7, further comprising:
determining that the request is a request to store data; and
storing information about the requester in the I/O hub in response to the determining, the information comprising:
the requester address; and
the operation code, the operation code identifying the operation that is to be performed.

13. A system for implementing non-standard I/O adapters in a standardized I/O architecture, the system comprising:
an I/O adapter communicatively coupled to an I/O bus; and
an I/O hub communicatively coupled to the I/O bus, the I/O hub including logic for implementing a method, the method comprising:
receiving a response, the response generated by a responder to indicate a completion of a request, the responder at an address, and the request initiated by the I/O adapter;
determining that the response is in a non-peripheral component interconnect (PCI) format, the I/O bus expecting a PCI formatted request with a completer identifier at a first location in a header of the response;
reformatting the response into the PCI format supported by the I/O bus, the reformatting comprising storing an identifier of the address of the responder, and a response code at the first location in the header of the PCI formatted response;
sending the reformatted response to the I/O adapter; and
receiving the PCI formatted response at the I/O adapter.

14. The system of claim 13, wherein the I/O bus is a PCIe bus.

15. The system of claim 13, wherein the format of the response is an I/O expansion format.

16. The system of claim 13, wherein the I/O adapter comprises an I/O expansion adapter, the I/O expansion adapter sharing the I/O bus with at least one PCIe adapter.

17. The system of claim 13, wherein the PCI formatted response is in a format not supported by the I/O adapter and the responder.

18. The system of claim 13, further comprising:
determining that the request is a request to store data; and
updating information about the request in the I/O hub in response to the determining, the information comprising flagging that the request has been completed.

19. A method for implementing non-standard I/O adapters in a standardized I/O architecture, the method comprising:
receiving a response at an I/O adapter, the response generated by a responder to indicate a completion of a request, the responder at an address, and the request initiated by the I/O adapter;
determining that the response is in a non-peripheral component interconnect (PCI) format, the I/O bus expecting a PCI formatted request with a completer identifier at a first location in a header of the response;
reformatting the response into the PCI format supported by the I/O bus, the reformatting comprising storing an identifier of the address of the responder, and a response code at the first location in the header of the PCI formatted response;
sending the PCI formatted response to the I/O adapter; and
receiving the PCI formatted response at the I/O adapter.

20. The method of claim 19, wherein the I/O bus is a PCIe bus.

21. The method of claim 19, wherein the format of the response is an I/O expansion format.

22. The method of claim 19, wherein the I/O adapter comprises an I/O expansion adapter, the I/O expansion adapter sharing the I/O bus with at least one PCIe adapter.

23. The method of claim 19, wherein the PCI formatted response is in a format not supported by the I/O adapter and the responder.

24. The method of claim 19, further comprising:
determining that the request is a request to store data; and
updating information about the request in the I/O hub in response to the determining, the information comprising flagging that the request has been completed.

* * * * *